United States Patent [19]
Venable

[11] Patent Number: 5,361,646
[45] Date of Patent: Nov. 8, 1994

[54] LOCKING MECHANISM

[75] Inventor: Frederick D. Venable, Lafayette, Ind.

[73] Assignee: TRW Inc., Lyndhurst, Ohio

[21] Appl. No.: 139,427

[22] Filed: Oct. 20, 1993

Related U.S. Application Data

[62] Division of Ser. No. 41,729, Apr. 1, 1993.

[51] Int. Cl.$^5$ .............................................. G05G 5/06
[52] U.S. Cl. ........................................ 74/531; 74/493
[58] Field of Search ................... 74/493, 531; 280/775

[56] References Cited

U.S. PATENT DOCUMENTS

| | | |
|---|---|---|
| 3,874,480 | 4/1975 | Porter et al. . |
| 4,041,796 | 8/1977 | Shishido . |
| 4,240,305 | 12/1980 | Denaldi et al. . |
| 4,244,237 | 1/1981 | Sprunger . |
| 4,449,419 | 5/1984 | Bruguera . |
| 4,476,741 | 10/1984 | Yamaguchi . |
| 4,788,880 | 12/1988 | Kester . |
| 5,088,767 | 2/1992 | Hoblingre et al. . |
| 5,259,264 | 11/1993 | Bodin et al. ......................... 74/493 |

FOREIGN PATENT DOCUMENTS

| | | | |
|---|---|---|---|
| 902586 | 1/1954 | Germany .............................. | 74/493 |
| 56-28050 | 3/1981 | Japan ................................... | 74/493 |
| 2-92779 | 4/1990 | Japan ................................... | 74/493 |

*Primary Examiner*—David W. Laub
*Attorney, Agent, or Firm*—Tarolli, Sundheim & Covell

[57] ABSTRACT

A locking mechanism for locking a first member in any one of an infinite number of positions relative to a second member includes a resilient members for urging the first and second members toward each other to apply a friction force between the first and second members to prevent relative movement between the first and second members. An actuator member for releasing the friction force between the first and second members has a first position in which the first and second members are prevented from moving relative to each other. The actuator member has a second position in which the first and second members are positionable relative to each other. The locking mechanism includes a handle for moving the actuator member from its first position to its second position to release the friction force between the first and second members. The resilient members is operable to move the actuator member from its second position to its first position.

20 Claims, 9 Drawing Sheets

LOCKING MECHANISM

RELATED APPLICATION

This application is a divisional of application Ser. No. 041,729, filed Apr. 1, 1993, entitled "Tilt-Telescope Steering Column", which is assigned to the assignee of the present application.

BACKGROUND OF THE INVENTION

The present invention relates to a locking mechanism, and more specifically to a locking mechanism for locking a first member in any one of an infinite number of positions relative to a second member.

The locking mechanism of the present invention may be used in a steering column to lock a steering input shaft in any one of an infinite number of pivot positions relative to a steering column member, or the locking mechanism may be used to lock a first steering column member in any one of an infinite number of axial positions relative to a second steering column member.

A known locking mechanism is disclosed in U.S. Pat. No. 4,041,796. U.S. Pat. No. 4,041,796 discloses a locking mechanism for locking an input shaft of a steering column in any one of an infinite number of pivot positions relative to a steering column member. A spring applies a friction force to urge a supporting bracket connected with the input shaft to frictionally engage a connecting bracket connected with the steering column member to prevent relative movement between the supporting and connecting brackets. A surface of a cam engages a pressure plate to compress the spring. A handle connected to the cam is rotated to release the friction force applied by the spring and permit pivotal movement between the input shaft and the steering column member.

U.S. Pat. No. 3,874,480 discloses a locking mechanism for locking a rod in any one of an infinite number of axial positions relative to a cylindrical housing through which the rod extends. A coil spring having one end fixed relative to the housing is tightly wound around the rod to prevent relative movement between the rod and the housing. The spring is unwound from the rod to permit relative movement between the rod and the housing.

SUMMARY OF THE INVENTION

The locking mechanism of the present invention includes resilient means fox urging a first member, such as a bracket connected to a steering column member of a steering column, and a second member, such as a tilt-lock bar connected with an input shaft of the steering column, into contact with each other to create a friction force between the first and second members to prevent relative movement between the first and second members. An actuator member, for reducing and releasing the friction force between the first and second members created by the resilient means, has a first position in which the first and second members are prevented by the friction force from moving relative to each other. The actuator member has a second position in which the force on the first and second members is reduced or removed and the first and second members are movable relative to each other. The locking mechanism includes means for moving the actuator member from its first position to its second position in opposition to the force created by the resilient means to reduce or eliminate the friction force between the first and second members. The resilient means is operable to move the actuator member from its second position to its first position to prevent relative movement between the first and second members.

The locking mechanism also locks a third member, such as a flange connected with a second steering column member of the steering column, in any one of an infinite number of positions relative to the first and second members. The resilient means urges the first and third members toward each other to apply a friction force between the first and third members to prevent relative movement between the first and third members. A second actuator member has a first position in which the first and third members are prevented from moving relative to each other and a second position in which the first and third members are movable relative to each other. The moving means moves the second actuator member from its first position to its second position to permit relative positioning between the first and third members. The resilient means moves the second actuator member from its second position to its first position to prevent relative movement between the first and third members.

BRIEF DESCRIPTION OF THE DRAWINGS

The foregoing and other features of the present invention will become more apparent to one skilled in the art upon reading the following description of the present invention with reference to the accompanying drawings, wherein.

DESCRIPTION OF PREFERRED EMBODIMENT

Figure 1:
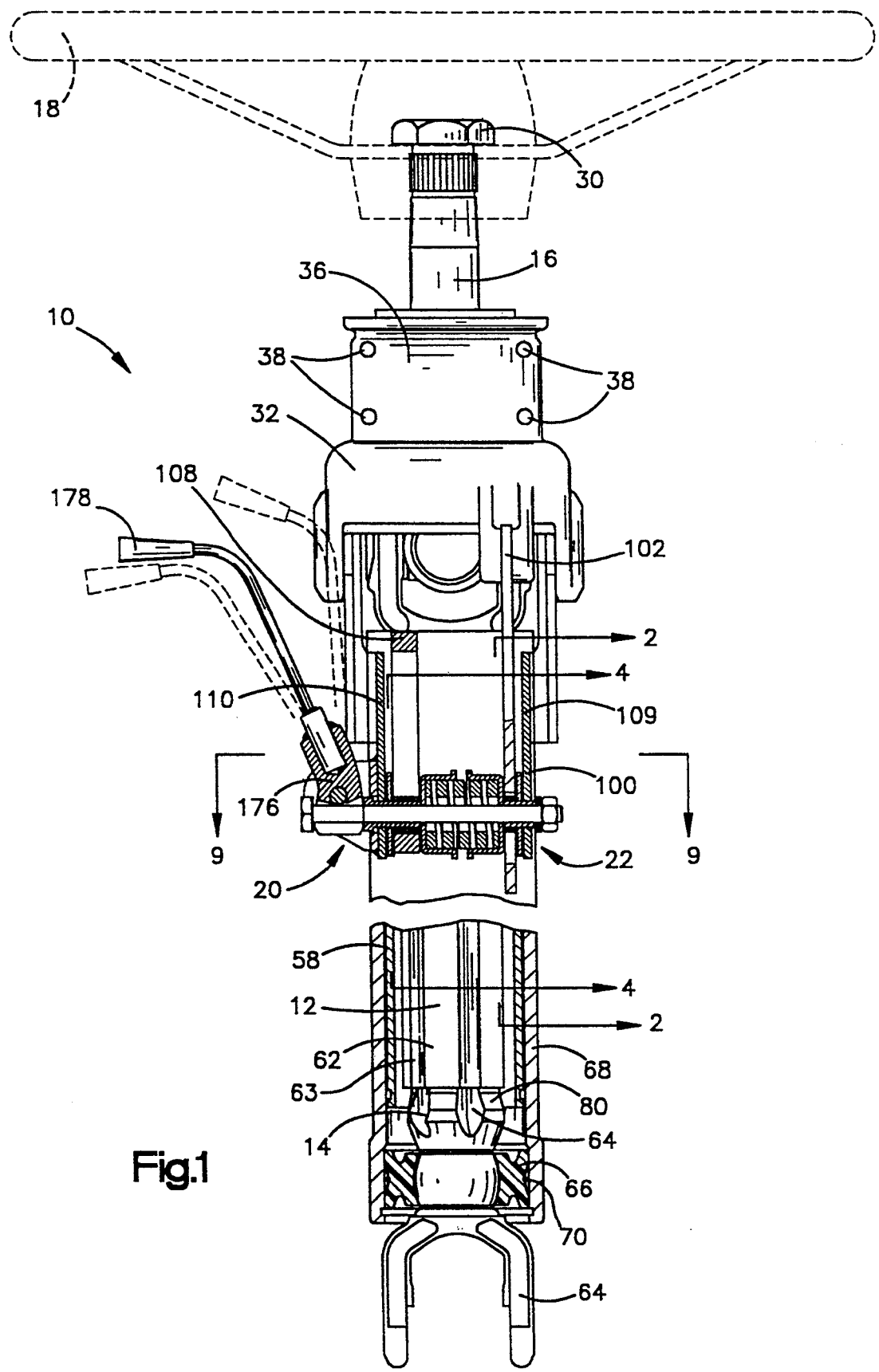
FIG. 1 is a sectional view of a steering column including the locking mechanism of the present invention.

An axially and angularly adjustable vehicle steering column 10 (FIG. 1) includes a pair of steering column members 12, 14 and an input shaft 16. A vehicle steering wheel 18 is attached to the input shaft 16 by a nut 30. The input shaft 16 and steering column members 12, 14 rotate upon rotation of the vehicle steering wheel 18. The steering column members 12, 14 telescope to effect axial adjustment of the steering wheel 18, see FIGS. 4 and 5. The input shaft 16 is pivotable relative to the steering column member 12 to effect angular adjustment of the steering wheel 18, see FIGS. 2 and 3.

A releasable telescope locking mechanism 20 (FIG. 1) locks the steering column members 12, 14 in any one of an infinite number of telescoped positions. A releasable tilt locking mechanism 22 locks the input shaft 16 in any one of an infinite number of pivot positions relative to the steering column member 12.

Figure 10:
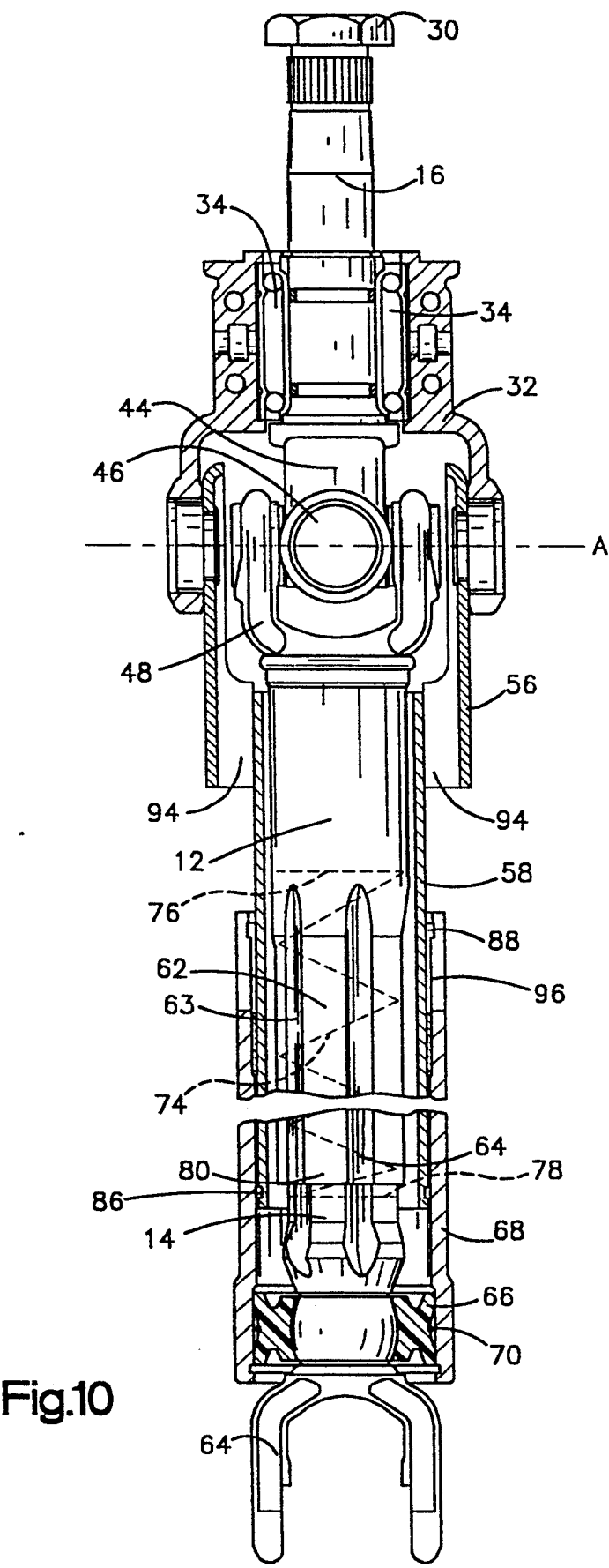
FIG. 10 is a sectional view of the steering column taken along the line 10—10 of FIG. 9.

The input shaft 16 extends into an upper housing 32 (FIG. 10). Bearings 34 (shown schematically in FIG. 10) are located in the upper housing 32 and support the input shaft 16 for rotation relative to the upper housing 32. A cover 36 (FIGS. 1 and 2) is connected to the upper housing 32 by screws 38. The cover 36 is removable from the upper housing 32 so that the bearings 34 may be reached for repair and maintenance.

The input shaft 16 is connected to a yoke 44 (FIG. 10) of a universal Joint 46. Another yoke 48 of the universal joint 46 is connected to the steering column member 12. The input shaft 16 can pivot, relative to the steering column member 12, about a pivot axis A of the universal joint 46. From the above, it should be clear that upon rotation of the steering wheel 18, the input shaft 16 and steering column member 12 rotate.

The upper housing 32 is pivotally connected to a pivot carrier 56 which is connected to the steering column member 12 by a jacket tube 58. The upper housing is pivotable about the pivot axis A relative to the pivot carrier 56 and the jacket tube 58. Therefore, the upper housing 32 pivots along with the input shaft 16 relative to the pivot carrier 56 and the steering column member 12. A tilt spring 60 connected between the upper housing 32 and the pivot carrier 56 biases the upper housing to pivot in a counterclockwise direction, as viewed in FIGS. 2 and 3, relative to the pivot carrier 56.

Figure 9:
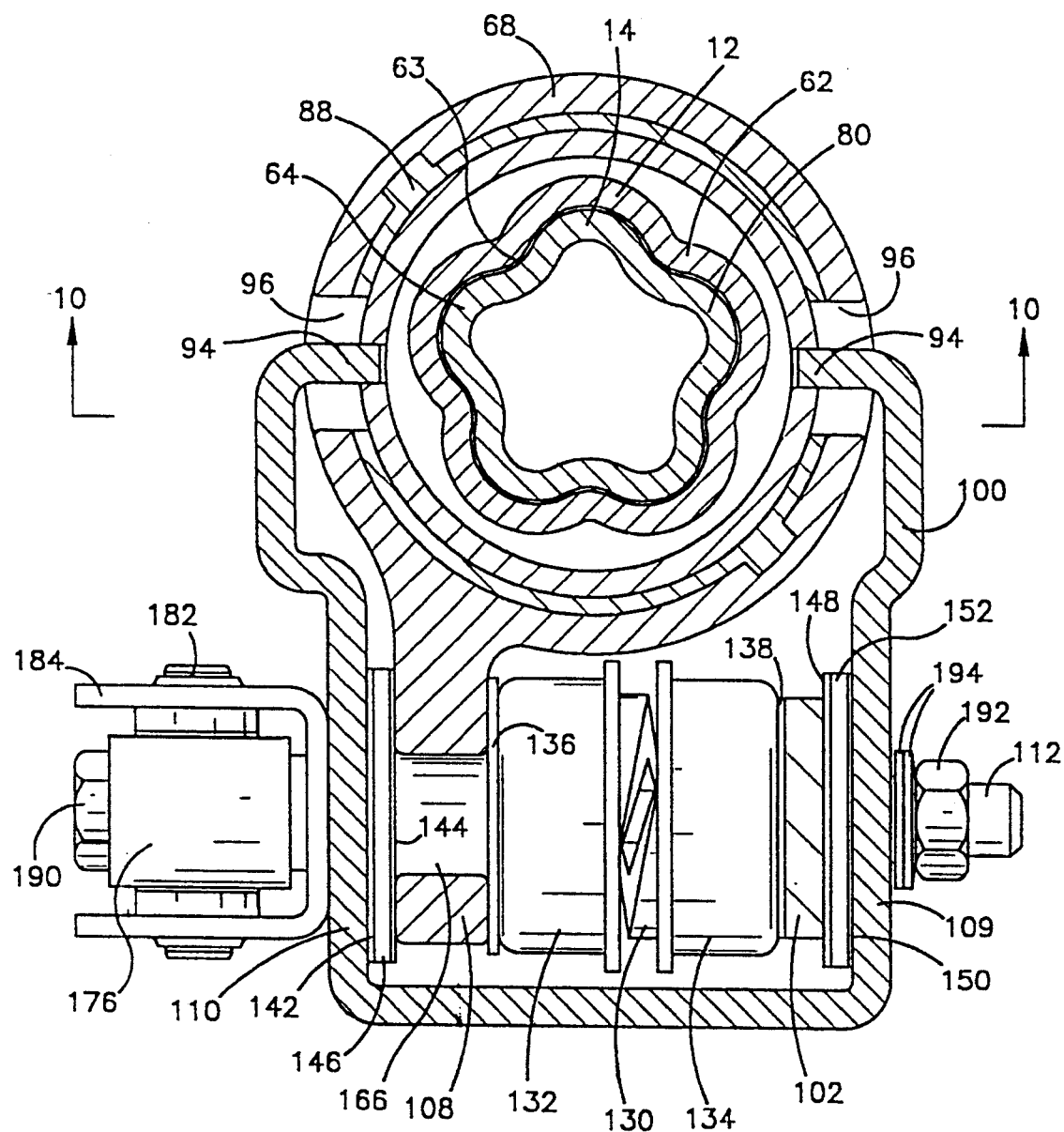
FIG. 9 is a sectional view taken along the line 9—9 of FIG. 1 further illustrating the locking mechanism.

The steering column member 14 extends into a lower tubular shaft portion 62 of the steering column member 12 (FIG. 10). The tubular shaft portion 62 has internal splines 63 (FIG. 9) thereon which mesh with external splines 64 on the steering column member 14. The splines 63 of the steering column member 12 mesh with the splines 64 of the steering column member 14 to effect rotation of the steering column member 14 upon rotation of the steering column member 12.

Steering column member 14 is connected to a yoke 64 (FIG. 10) which is connectable to another yoke connected to an output shaft (not shown). The output shaft is attached to the steering gear (not shown) of the vehicle. The steering column member 14 is supported by a split bearing 66 for rotation relative to a lower housing 68 which is connectable to a frame of the vehicle. An O-ring 70 extends around the bearing 66 to take up manufacturing tolerances and wear in the bearing 66. Upon rotation of the steering wheel 18 the input shaft 16 and the steering column members 12, 14 rotate and the rotational movement is transmitted to the output shaft to effect vehicle steering.

The steering column members 12, 14 may be moved axially (telescoped) relative to each other. One end of a spring 74 (shown schematically in FIG. 10) is located within the tubular shaft portion 62 of the steering column member 12 and acts against an end surface 76 of the tubular shaft portion 62. The other end of the spring 74 acts on a surface 78 in a tubular shaft portion 80 of the steering column member 14. The spring 74 acts to bias the steering column member 12 in a vertical direction as viewed in FIG. 10, relative to the steering column member 14.

A bushing 86 (FIGS. 4 and 5) is connected to a lower portion of the jacket tube 58. A bushing 88 is connected to an upper portion of the lower housing 68. The bushings 86 and 88 support the jacket tube 58 and the steering column member 12 for axial movement relative to the lower housing 68.

The pivot carrier 56 includes radially inwardly extending portions 94 (FIGS. 9 and 10) which are connected to the upper portion of the jacket tube 58. The bushing 88 and the lower housing 68 include slots 96. The radially inwardly extending portions 94 of the pivot carrier 56 extend into the slots 96 when the steering column 10 is in a fully compressed position.

Figure 2:
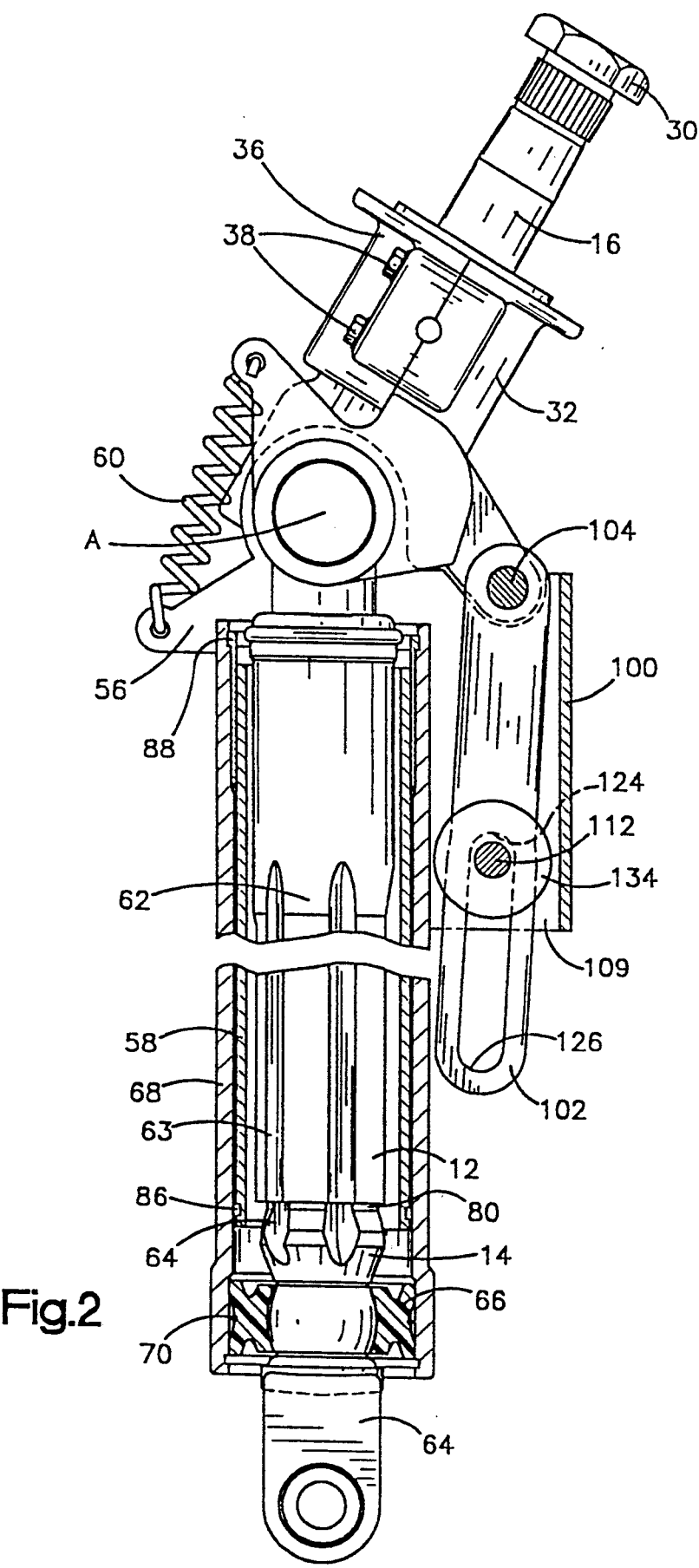
FIG. 2 is a sectional view taken along the line 2—2 of FIG. 1, showing the steering column in a first tilt position.
Figure 3:
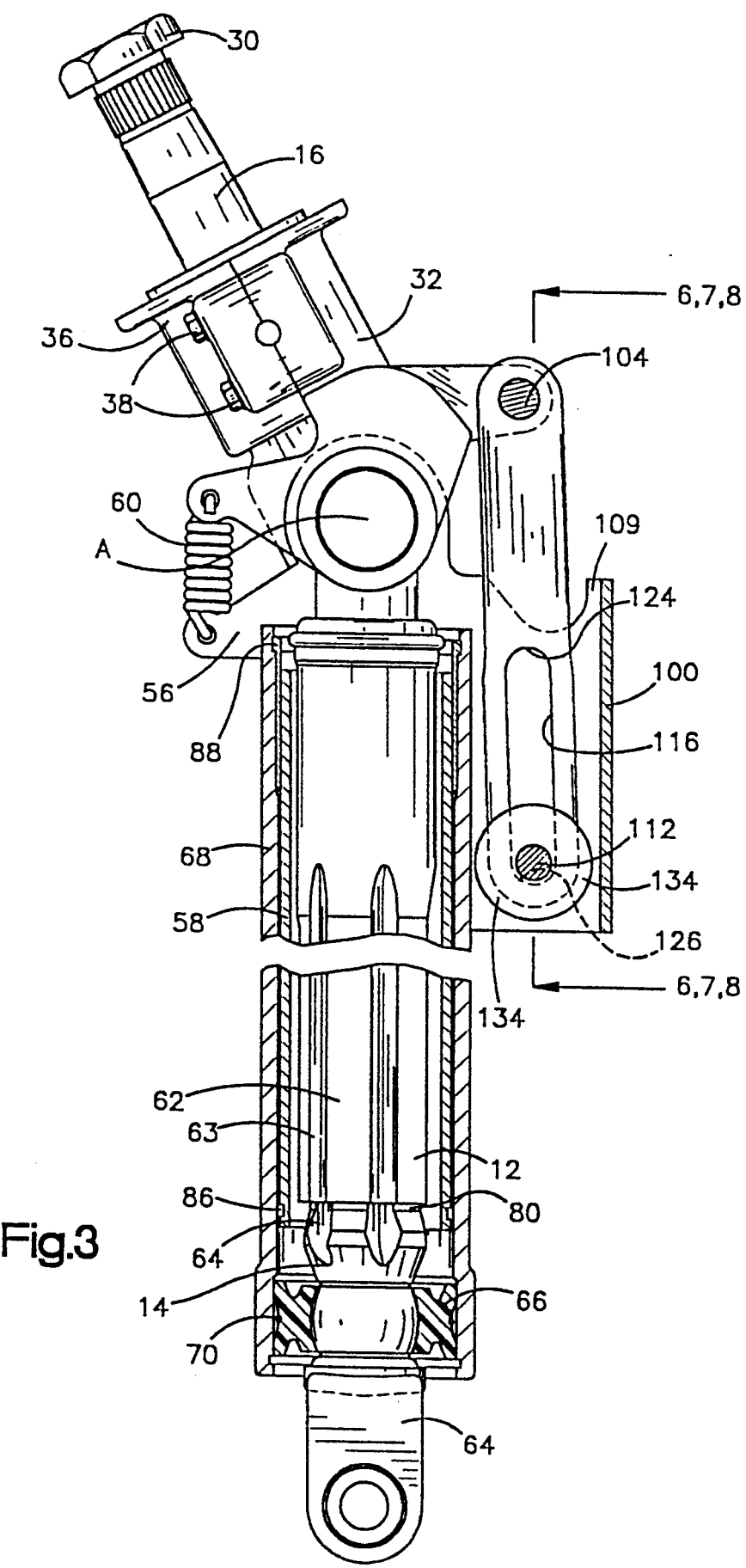
FIG. 3 is a sectional view, generally similar to FIG. 2, showing the steering column in a second tilt position.

Attached to and extending downwardly from the pivot carrier is a first member or a bracket 100 (FIG. 1). The bracket 100 (FIG. 9) extends around a second member or a tilt lock bar 102. The tilt lock bar 102 is pivotally connected to the upper housing 32 by a pin 104 (FIGS. 2 and 3). The bracket 100 also extends around a third member or a flange 108 (FIG. 9) extending from the lower housing 68. The bracket 100 includes a side wall 109 located adjacent the tilt lock bar 102 and a side wall 110 located adjacent the flange 108.

A shaft 112 (FIG. 6) extends through a slot 114 in the flange 108 of the lower housing 68, a slot 116 located in the tilt lock bar 102 and through the side walls 109 and 110 of the bracket 100. The slot 114 in the flange 108 of the lower housing 68 has an upper surface 120 for defining the fully extended position for the steering column 10, see FIG. 5. The slot 114 also has a lower surface 122 for defining a fully compressed position for the steering column 10, see FIG. 4. The tilt lock bar 102 has surfaces 124 and 126 for defining extreme tilt positions of the input shaft 16 relative to the steering column member 12, see FIGS. 2 and 3.

The shaft 112 extends through a spring 130 (FIG. 6) that applies a spring force to force spring cups 132 and 134 away from each other. A friction pad 136 attached to the spring cup 132 is located between spring cup 132 and the flange 108 of the lower housing 68. A friction pad 138 attached to the spring cup 134 is located between the spring cup 134 and the tilt lock bar 102. Friction pads 142 and 144 are spaced apart by a spacer 146 and are located between the flange 108 of the lower housing 68 and the side wall 110 of the bracket 100. Friction pads 148 and 150 are spaced apart by a spacer 152 and are located between the tilt lock bar 102 and the side wall 109. The spring 130 applies forces that clamp the flange 108 of the housing 68 and the tilt lock bar 102 to the bracket 100 to prevent telescoping or tilting of the steering column 10. The friction pads aid in preventing relative movement between the tilt lock bar 102, the flange 108 and the bracket 100.

An actuation sleeve 156 for releasing the force applied by the spring 130 to clamp the tilt lock bar 102 to the side wall 109 of the bracket 100 extends coaxially around a portion of the shaft 112. The actuation sleeve 156 extends through the side wall 109 and a plastic or rubber bushing 158 located in the slot 116 in the tilt lock bar 102. The bushing 158 provides for easy movement of the tilt lock bar 102 relative to the shaft 112 when the tilt locking mechanism 22 is released. The bushing 158 does not generate any noise when it engages the surfaces 124 and 126 of the tilt lock bar when positioning the input shaft 16 in an extreme tilt position. An axial end portion 160 of the actuation sleeve 156 engages the spring cup 134. The actuation sleeve 156 is axially movable with the shaft 112 relative to the side wall 109 and the bushing 158.

An actuation sleeve 164 for releasing the force applied by the spring 130 to clamp the side wall 110 of the bracket 100 to the flange 108 extends coaxially with another portion of the shaft 112. The actuation sleeve 164 extends through a bushing 166 located in the slot 114 of the flange 108 and through the side wall 110. The bushing 166 provides for easy movement of shaft 112 relative to the flange 108 when the telescope locking mechanism 20 is released. An axial end portion 168 of the actuation sleeve 164 engages the spring cup 132. The actuation sleeve 164 includes a head 170. An annular surface 172 of the head 170 engages a cam surface 174 of a cam 176 connected to a handle 178 for unlocking the locking mechanisms 20 and 22. The actuation sleeve 164 is axially movable relative to the shaft 112, the side wall 110 and the bushing 166.

A pivot pin 182 extends through the cam 176 to pivotally connect the handle 178 and the cam 176 to flanges 184 connected to the side wall 110 of the bracket 100. Therefore, the handle 178 moves along with the bracket 100, the pivot carrier 56 and the steering column member 12 when the steering column member 12 is moved axially relative to the steering column member 14 and the lower housing 68. Therefore, the handle 178 remains at the same distance from the steering wheel 18.

The cam 176 includes a second cam surface 188 that engages a head 190 of the shaft 112. A nut 192 is threadably connected to the shaft 112 on an end opposite the head 190. A pair of Belleville washers 194 are located between the nut 192 and the actuation sleeve 156. The Belleville washers 194 take up manufacturing tolerances and wear in the locking mechanisms 20 and 22 so that the locking mechanisms provide reliable locking.

The spring 130 biases the tilt locking mechanism 22 into a position in which the tilt lock bar 102 is clamped to the side wall 109 to prevent the input shaft 16 from pivoting relative to steering column member 12. The spring 130 also biases the handle 178 and cam 176 into the locked position shown in FIG. 6. Upon pivoting the handle 178 and the cam 176 in a clockwise direction, as viewed in FIG. 6, from the locked position to a tilt release position shown in FIG. 7, the cam surface 188 engages the head 190 of the shaft 112. The cam 176 causes the shaft 112 to move axially towards the left, as seen in FIG. 7.

Upon axial movement of the shaft 112 to the left, the nut 192 and the Belleville washers 194 cause the actuation sleeve 156 to move along with the shaft 112. The axial end surface 160 of the actuation sleeve 156 engages the spring cup 134 and moves the spring cup 134 and the friction pad 138 to the left to compress the spring 130. The spring force clamping the tilt lock bar 102 to the side wall 109 is released and the spring force clamping the side wall 110 to the flange 108 is not released. The upper housing 32 and the input shaft 16 can pivot about the axis A relative to the pivot carrier 56 and the steering column member 12. When the handle 178 is released after pivotally positioning the input shaft 16, the spring 130 moves the tilt locking mechanism 22 into a locked position, as seen in FIG. 6, to clamp the tilt lock bar 102 to the side wall 109.

When the tilt lock mechanism 22 is released, the tilt lock bar 102 is movable relative to the bracket 100 to position the input shaft 16 in any one of an infinite number of pivot positions. The surface 124 of the slot 116 in the tilt lock bar 102 engages the bushing 158 located in the slot 116 when the input shaft 16 is in an extremely clockwise position about the pivot axis A, as seen in FIG. 2. The surface 126 of the slot 116 engages the bushing 158 when the input shaft 16 is in an extremely counterclockwise position, as seen in FIG. 3. While adjusting the pivot position of the input shaft 16, the tilt lock bar 102 pivots relative to the pivot carrier 32 and about the shaft 112.

Figure 6:
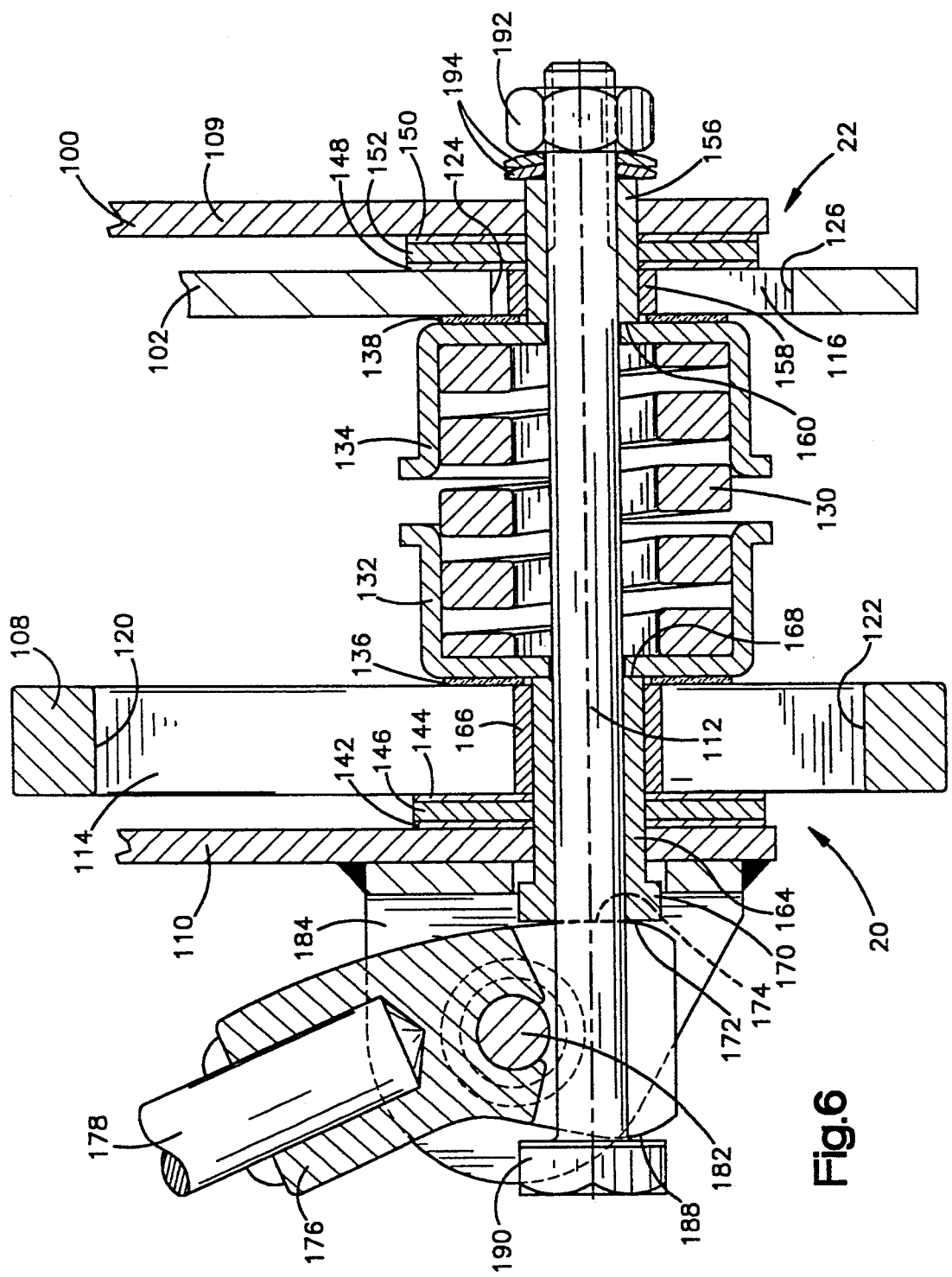
FIG. 6 is an enlarged sectional view of the locking mechanism for locking the steering column in a desired adjusted position.
Figure 7:
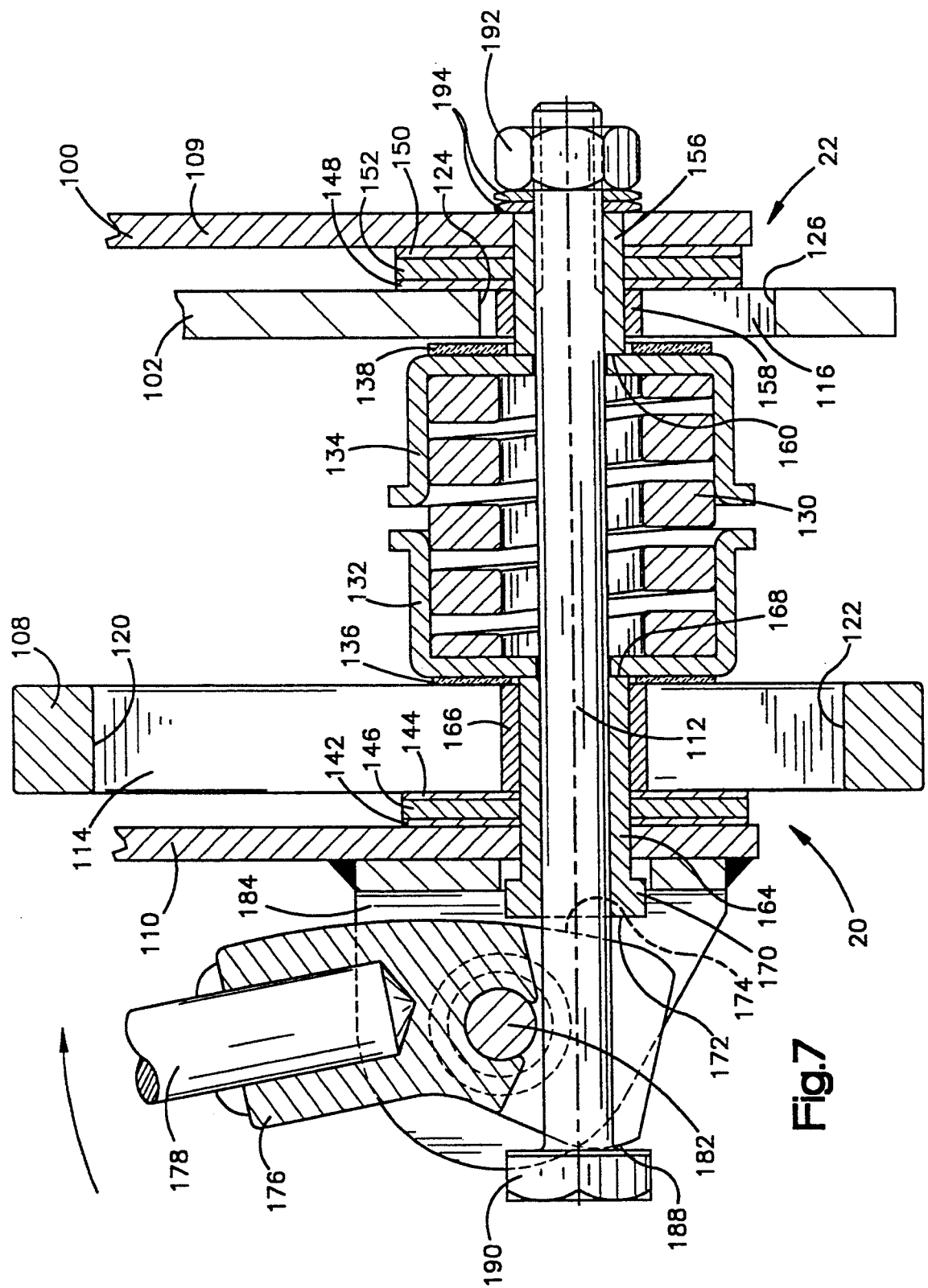
FIG. 7 is an enlarged sectional view of the locking mechanism of FIG. 6 showing the locking mechanism in a condition in which the tilt position of the steering column is adjustable.
Figure 8:
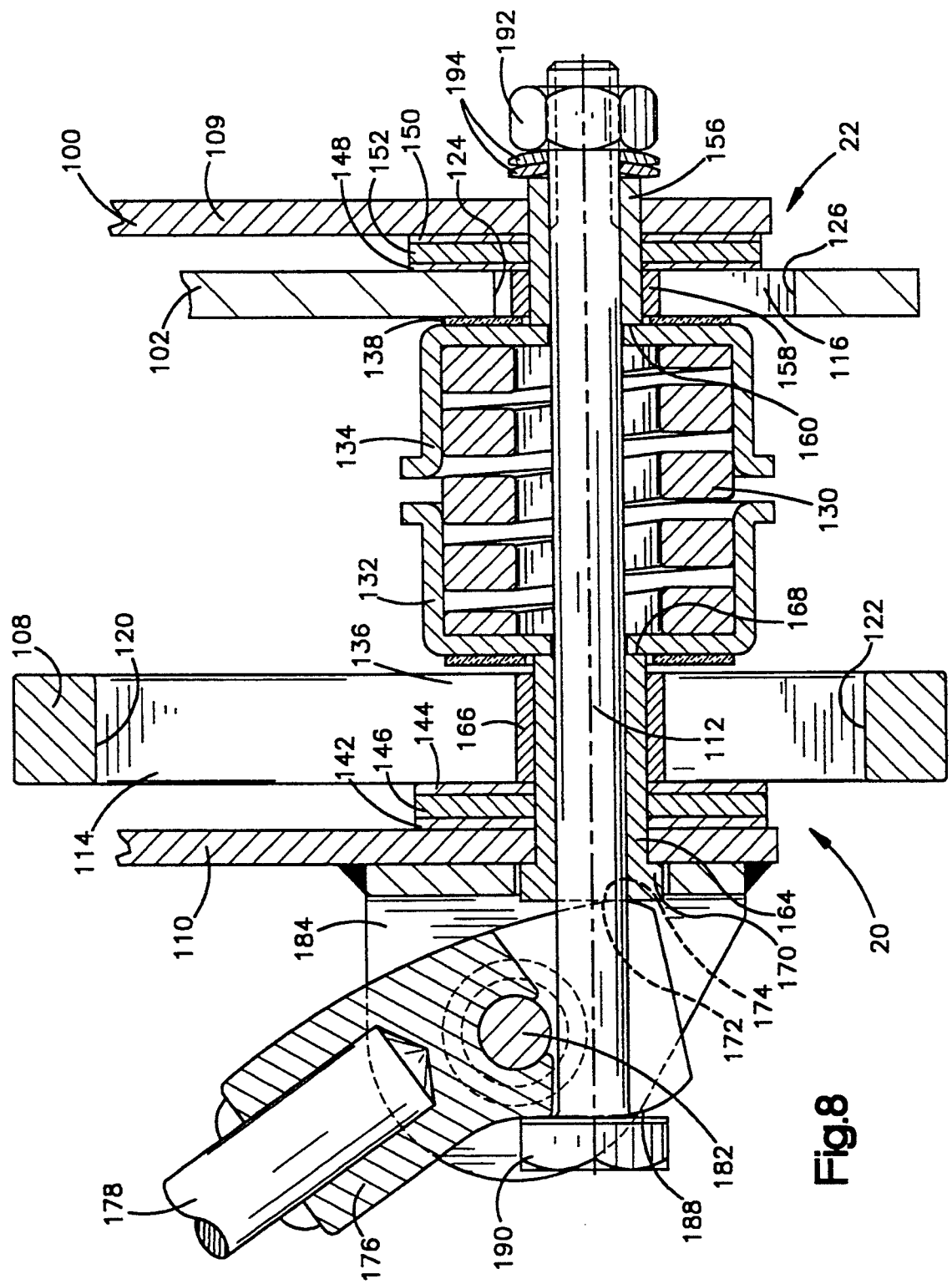
FIG. 8 is an enlarged sectional view of the locking mechanism of FIG. 6 showing the locking mechanism in a condition in which the axial position of the steering column is adjustable.

Upon pivoting the handle 178 and cam 176 in a counterclockwise direction, as viewed in FIG. 6, from the locked position to a telescope release position shown in FIG. 8, the cam surface 174 engages the surface 172 on the head 170 of the actuation sleeve 164. The cam 176 causes the actuation sleeve 164 to move towards the right as viewed in FIG. 8. The axial end surface 168 of the actuation sleeve 164 engages the spring cup 132 to move the spring cup 132 and the friction pad 136 towards the right to compress the spring 130. The spring force clamping the flange 108 of the lower housing 68 to the side wall 110 of the bracket 100 is released and the spring force clamping the tilt lock bar 102 to the side wall 109 is not released. Therefore, the pivot carrier 56 can be moved relative to the lower housing 68 to move the steering column member 12 axially relative to the steering column member 14. When the handle 178 is released after axially positioning the steering column member 12, the spring 130 moves the telescope locking mechanism 22 to its locked position, as seen in FIG. 6, to clamp the side wall 110 to the flange 108.

Figure 4:
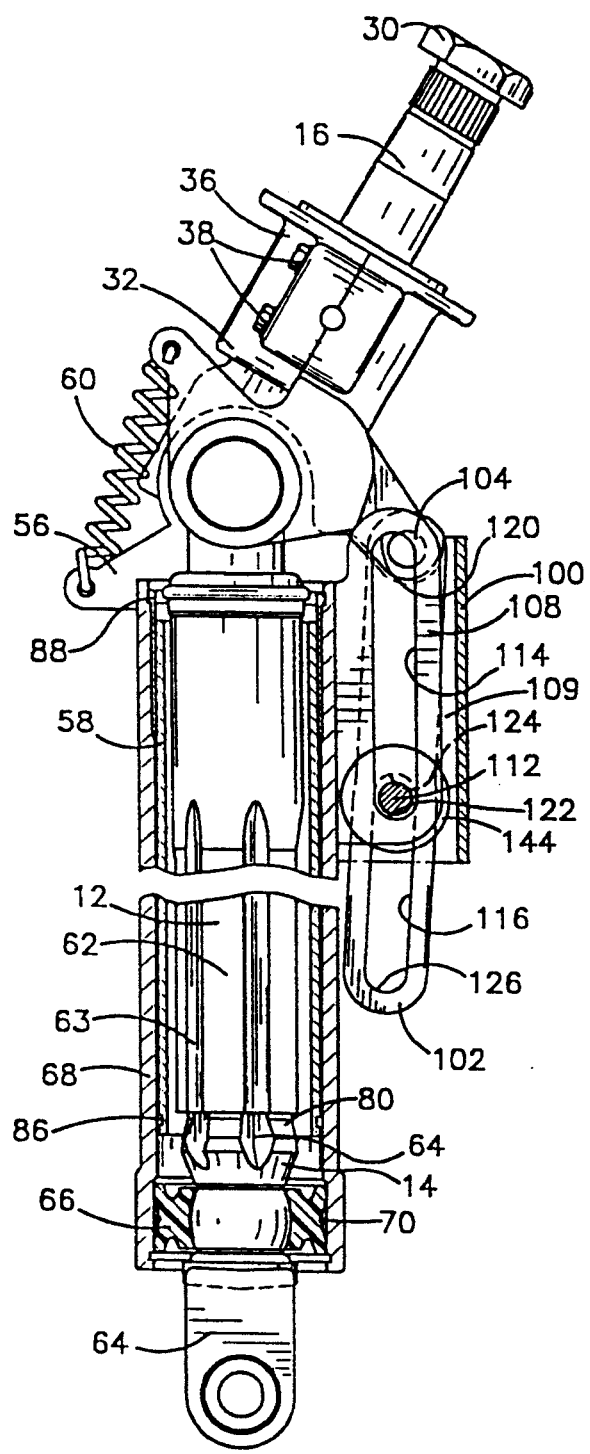
FIG. 4 is a sectional view taken along the line 4—4 of FIG. 1, showing the steering column in a fully compressed position.
Figure 5:
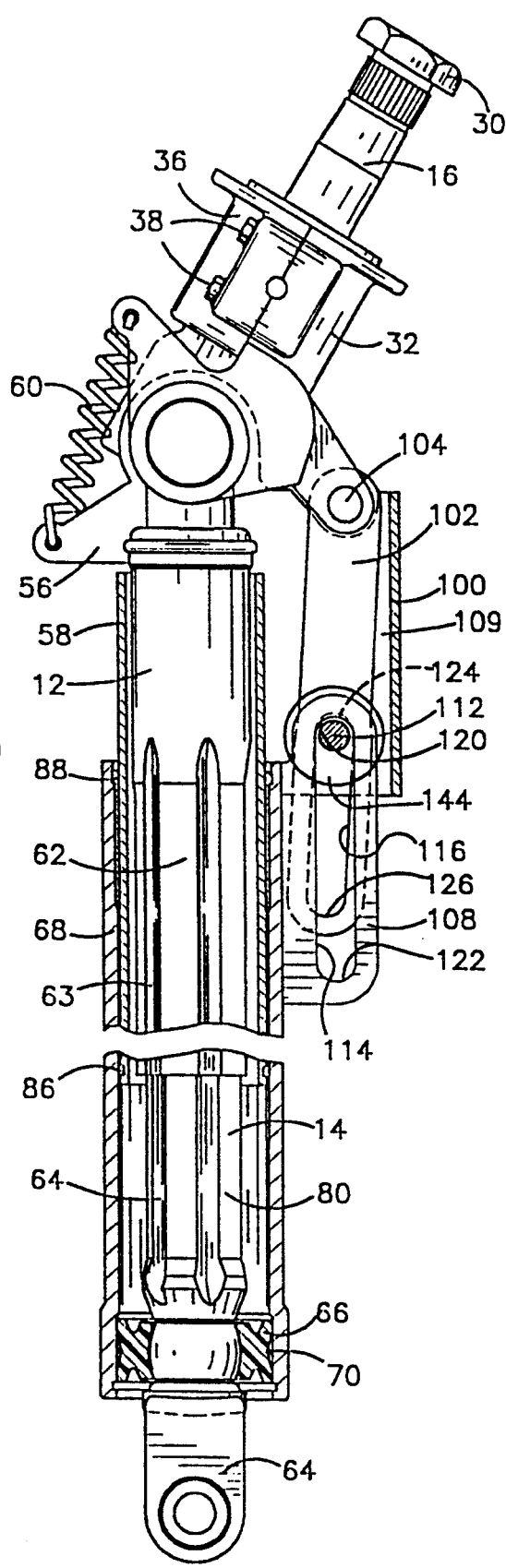
FIG. 5 is a sectional view, generally similar to FIG. 4, showing the steering column in a fully extended position.

When the telescope locking mechanism 20 is released, the bracket 100 and shaft 112 are movable relative to the flange 108 on the lower housing 68 to position the steering column member 12 axially relative to the steering column member 14 in any one of the infinite number of axial positions. The bushing 166 in the slot 114 of the flange 108 engages the surface 122 when the steering column 10 is in the fully compressed position as seen in FIG. 4. The bushing 166 engages the surface 120 of the slot 114 when the steering column is in the fully extended position. While moving the bracket 100, the tilt lock bar 102 remains clamped to the side wall 109 and moves along with the bracket. Thus, the pivot position of the input shaft 16 does not change while adjusting the axial position of the steering column member 12.

Although the present invention has been shown with a handle for releasing the telescope locking mechanism and the tilt locking mechanism, it is contemplated that any known means for releasing the locking mechanisms can be used. For example, solenoids could be mounted on the steering column to release the telescope locking mechanism and the tilt locking mechanism. A switch located on the floor of the vehicle, in the steering wheel, or any other convenient location could be used to activate the solenoids. Also, a cable could be connected between the locking mechanisms and a foot or hand operated lever not located on the steering column for releasing the locking mechanisms.

From the above description of the invention, those skilled in the art will perceive improvements, changes and modifications. Such improvements, changes and modifications within the skill of the art are intended to be covered by the appended claims.

Having described the invention, the following is claimed:

1. A locking mechanism comprising:

means for locking a first member in any one of an infinite number of positions relative to a second member;

resilient means for urging the first and second members toward each other to apply a friction force between the first and second members to thereby prevent relative movement between the first and second members;

a first actuator member for releasing the friction force between the first and second members, said first actuator member having a first position in which the first and second members are prevented from moving relative to each other and a second position in which the first and second members are positionable relative to each other; and means for moving said first actuator member from its first position to its second position to release the friction force between the first and second members;

said resilient means including means for moving said first actuator member from its second position to its first position to prevent relative movement between the first and second members.

2. A locking mechanism as set forth in claim 1 wherein said means for moving said first actuator member from its first position to its second position includes a cam surface engageable with said first actuator member, said cam surface engaging said first actuator member to move said first actuator member from its first position to its second position.

3. A locking mechanism as set forth in claim 1 wherein said first actuator member extends through openings in the first and second members and is engageable with said resilient means.

4. A locking mechanism as set forth in claim 1 wherein said resilient means includes spring means urging the first and second members toward each other, said first actuator member compressing said spring means as said first actuator member moves from its first position to its second position to prevent said spring means from urging the first and second members toward each other.

5. A locking mechanism as set forth in claim 1 wherein said locking mechanism locks a third member in any one of an infinite number of positions relative to the first and second members, said resilient means urging the first and third members toward each other to apply a friction force between the first and third members to prevent relative movement between the first and third members.

6. A locking mechanism for locking a first member in any one of an infinite number of positions relative to a second member, said locking mechanism comprising:

resilient means for urging the first and second members toward each other to apply a friction force between the first and second members to thereby prevent relative movement between the first and second members;

a first actuator member for releasing the friction force between the first and second members, said first actuator member having a first position in which the first and second members are prevented from moving relative to each other and a second position in which the first and second members are positionable relative to each other; and means for moving said first actuator member from its first position to its second position to release the friction force between the first and second members;

said resilient means including means for moving said first actuator member from its second position to its first position to prevent relative movement between the first and second members;

said first actuator member moving said resilient means away from the second member when said first actuator member moves from its first position to its second position, said resilient means moving toward the second member as said resilient means moves said first actuator member from its second position to its first position.

7. A locking mechanism as set forth in claim 6 further including a shaft extending through openings in the first and second members, said first actuator member including an axially movable cylindrical sleeve extending through the openings in the first and second members, said shaft extending through said sleeve and supporting said sleeve for axial movement.

8. A locking mechanism as set forth in claim 7 wherein said means for moving said first actuator member from its first position to its second position is operable to axially move said shaft to thereby axially move said sleeve.

9. A locking mechanism as set forth in claim 7 wherein said means for moving said first actuator member from its first position to its second position is operable to axially move said sleeve relative to said shaft.

10. A locking mechanism for locking a first member in any one of an infinite number of positions relative to a second member, said locking mechanism comprising:

resilient means for urging the first and second members toward each other to apply a friction force between the first and second members to thereby prevent relative movement between the first and second members;

a first actuator member for releasing the friction force between the first and second members, said first actuator member having a first position in which the first and second members are prevented from moving relative to each other and a second position in which the first and second members are positionable relative to each other; and means for moving said first actuator member from its first position to its second position to release the friction force between the first and second members;

said resilient means including means for moving said first actuator member from its second position to its first position to prevent relative movement between the first and second members;

said resilient means including spring means urging the first and second members toward each other, said first actuator member compressing said spring means as said first actuator member moves from its first position to its second position to prevent said spring means from urging the first and second members toward each other, said spring means including a compression spring and a spring cup surrounding at least one end portion of said spring, said spring cup being engageable with the second member to urge the second member toward the first member, said first actuator member being engageable with said spring cup to move said spring cup out of engagement with the second member.

11. A locking mechanism for locking a first member in any one of an infinite number of positions relative to a second member, said locking mechanism comprising:

resilient means for urging the first and second members toward each other to apply a friction force between the first and second members to thereby prevent relative movement between the first and second members;

a first actuator member for releasing the friction force between the first and second members, said first actuator member having a first position in which the first and second members are prevented from moving relative to each other and a second position in which the first and second members are positionable relative to each other; and means for moving said first actuator member from its first position to its second position to release the friction force between the first and second members;

said resilient means including means for moving said first actuator member from its second position to its first position to prevent relative movement between the first and second members;

said locking mechanism locking a third member in any one of an infinite number of positions relative to the first and second members, said resilient means urging the first and third members toward each other to apply a friction force between the first and third members to prevent relative movement between the first and third members;

said resilient means including spring means located between the second and third members, said spring means urging the second member toward a first portion of the first member and the third member toward a second portion of the first member.

12. A locking mechanism for locking a first member in any one of an infinite number of positions relative to a second member, said locking mechanism comprising:

resilient means for urging the first and second members toward each other to apply a friction force between the first and second members to thereby prevent relative movement between the first and second members;

a first actuator member for releasing the friction force between the first and second members, said first actuator member having a first position in which the first and second members are prevented from moving relative to each other and a second position in which the first and second members are positionable relative to each other;

means for moving said first actuator member from its first position to its second position to release the friction force between the first and second members;

said resilient means including means for moving said first actuator member from its second position to its first position to prevent relative movement between the first and second members;

said locking mechanism locking a third member in any one of an infinite number of positions relative to the first and second members, said resilient means urging the first and third members toward each other to apply a friction force between the first and third members to prevent relative movement between the first and third members; and a second actuator member for releasing the friction force between the first and third members, said second actuator member having a first position in which the first and third members are prevented from moving relative to each other and a second position in which the first and third members are positionable relative to each other, said resilient means being operable to move said second actuator member from its second position to its first position.

13. A locking mechanism as set forth in claim 12 wherein said means for moving said first actuator member from its first position to its second position is operable to move said second actuator member from its first position to its second position.

14. A locking mechanism as set forth in claim 13 wherein said means for moving said first actuator member from its first position to its second position includes a handle, said handle having a first position in which said first actuator member is in its first position and said second actuator member is in its first position to prevent relative movement between the first, second, and third members, a second position in which said first actuator member is in its second position and said second actuator member is in its first position to allow relative positioning between the first and second members and prevent relative movement between the first and third members, and a third position in which said first actuator member is in its first position and said second actuator member is in its second position to prevent relative movement between the first and second members and allow relative positioning between the first and third members.

15. A locking mechanism as set forth in claim 12 wherein said resilient means urges the first and second members toward each other to apply a friction force between the first and second members to thereby prevent relative movement between the first and second members when said second actuator member is in its second position to allow relative positioning between the first and third members.

16. A locking mechanism as set forth in claim 12 wherein said resilient means, said first and second actuator members, and said means for moving said first actuator member from its first position to its second position are connected with the first member and positionable relative to the second and third members along with the first member.

17. A locking mechanism as set forth in claim 12 further including a shaft extending through openings in the first, second and third members, said first actuator member comprising a first cylindrical sleeve extending through the openings in the first and second members, said shaft being coaxial with and extending through said first sleeve to support said first sleeve for axial movement, said second actuator member comprising a second cylindrical sleeve extending through the openings in the first and third members, said shaft being coaxial with and extending through said second sleeve to support said second sleeve for axial movement.

18. A locking mechanism as set forth in claim 17 wherein said shaft extends through said resilient means.

19. A locking mechanism as set forth in claim 17 wherein said shaft includes a head, said means for moving said first actuator member from its first position to its second position includes a first cam surface engageable with said head of said shaft to axially move said shaft to thereby axially move said first sleeve and a second cam surface engageable with said second sleeve to axially move said second sleeve.

20. A locking mechanism as set forth in claim 19 wherein said first and second sleeves are coaxial, said first cam surface being operable to move said first sleeve in a first axial direction, said second cam surface being operable to move said second sleeve in a second axial direction opposite to the first axial direction.

* * * * *